April 22, 1947.   F. HOTCHNER   2,419,216
ILLUMINATED DISPLAY DEVICE HAVING ANIMATION EFFECTS
Filed Feb. 2, 1942   3 Sheets-Sheet 1
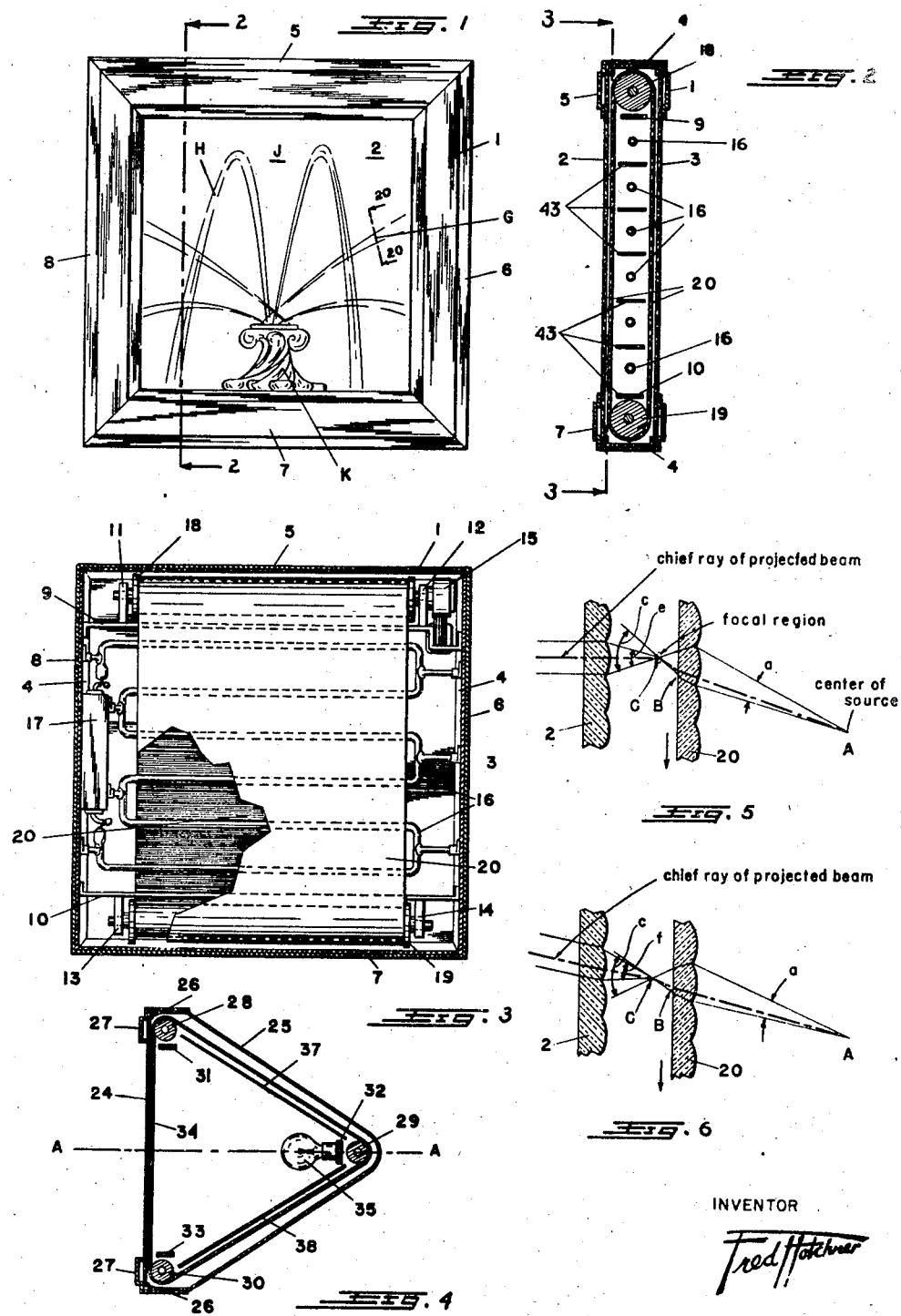
INVENTOR
Fred Hotchner INVENTOR
Fred Hotchner April 22, 1947. F. HOTCHNER 2,419,216
ILLUMINATED DISPLAY DEVICE HAVING ANIMATION EFFECTS
Filed Feb. 2, 1942 3 Sheets-Sheet 3
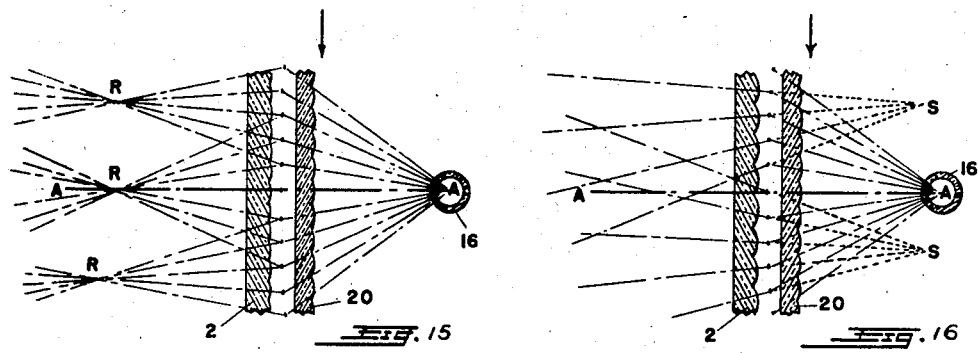
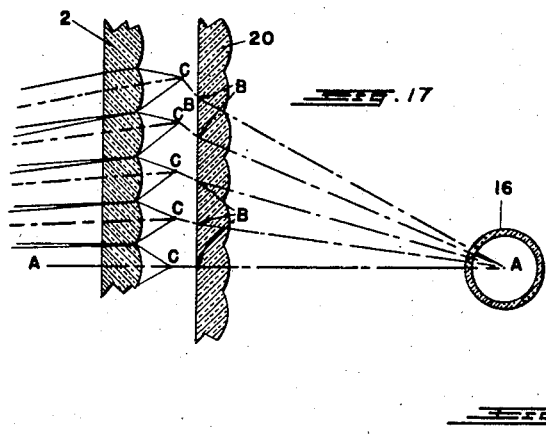
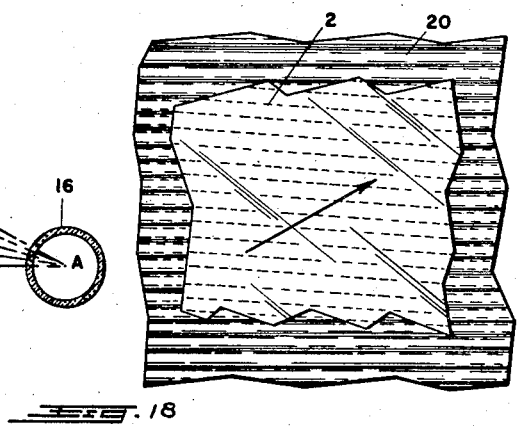
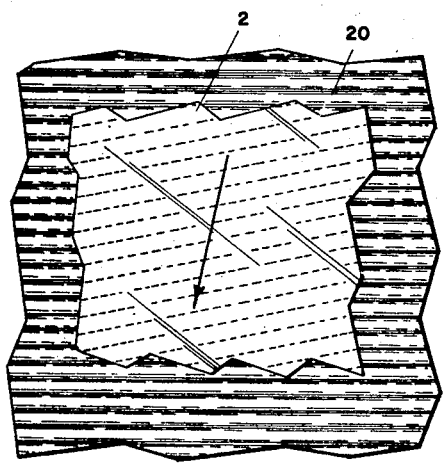
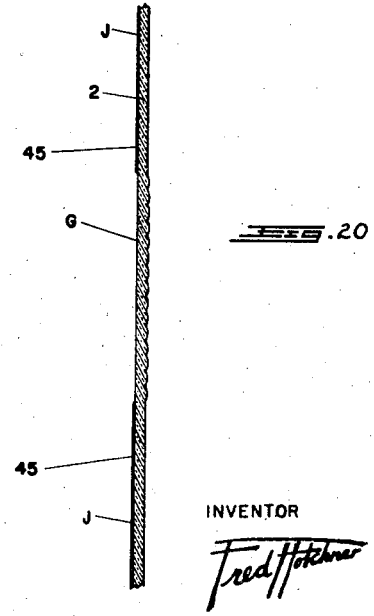
INVENTOR
Fred Hotchner Patented Apr. 22, 1947

2,419,216

UNITED STATES PATENT OFFICE 2,419,216

ILLUMINATED DISPLAY DEVICE HAVING ANIMATION EFFECTS

Fred Hotchner, Los Angeles, Calif.

Application February 2, 1942, Serial No. 429,299

11 Claims. (Cl. 40—130)

This invention relates to an illuminated display having animation effects such as pictures, characters or the like in apparent motion, and is directed to the production of brilliant, realistic animation effects by means of simple, rugged and low cost apparatus. The invention also is applicable in certain of its features to special uses in signal and decorative illumination services.

It is an object hereof to produce brilliant lighting effects, true to detail and in direction and speed in the motions represented. To this end and further to the end of making the most efficient possible use of the light available it is an object to produce the effects by refracting light rays through the shortest possible paths from the source to the observer with only such absorption and scattering as might be unavoidable due to optical imperfections of the material used and dirt collected on the surfaces of the light transmitting elements.

It is a further object to produce animation effects which are representative of action at speeds much higher than the actual movements of the mechanical parts involved to the end of simplifying the apparatus and reducing operating troubles.

It is a further object to produce animation effects in which the effect may be moving in any direction independent of the actual movement of the mechanical parts, even counter to the movement thereof. Further I provide for movement at different speeds and in different directions from place to place over the display surface.

The effects are in the form of dark and light regions which are seen to move over the display surface. In order to reduce the harshness of this form of definition in certain cases, it is an object to provide a general movement of dark and light areas in a given direction and at the desired speed, which movement in finer detail is varied from the general movement to give lifelike action.

The effects observed are due to the perception by the observer of the light of beams which are selectively directed to the field of view. It is an object hereof to produce and project those beams in such manner that the normal field of view is effectively covered thereby to produce true representations without scattering the light in directions where it will not be effectively used.

It is a further object to produce non-animated background illumination by the same light sources and refractor elements which produce the moving effects in order to provide for substantially any type of representation with simple apparatus.

The invention is related in certain broad respects to those disclosed in my Patents Nos. 2,272,202, 2,272,945 and 2,272,947. In all these instances the effects are produced by the condensation of light rays from the sources into beams and the projection of those beams selectively to the field of view over which they move in such order that an observer is reached, at each instant of the action, by beams from those portions of the display surface which are to appear to him as lighted at that instant.

The motion effects produced are due to the order of coverage of the observer position by the projected beams, as distinguished from filtering or diffusing of the light at the surface of the conventional lighted picture. That is, at each instant of the action from any particular point of view, the observer is reached by light beams from area combinations of the display surface definitive of the action at that instant. From the areas which he sees as dark at that instant, the light is not blocked or scattered but merely directed to other points of view where other stages of the action will be seen at that instant.

It is an object to provide for more detailed representation of the moving scenes in comparison with those produced by the devices of said copending applications and further to produce effects over areas relatively more extended and independent of the shape and size of the light source.

In connection with the production of double faced signs such as that shown in the drawings it is an object to produce the same effect on the two sides of such a display with a refractor which moves relatively in opposite directions on each side.

While the invention is well adapted to the use of gaseous conduction lights in which connection it is shown herein as a preferred embodiment, it is an object hereof to make use as well of incandescent lights where the peculiar characteristics of concentrated light sources are advantageous.

The beams projected by my device are of narrow divergence in one direction and therefore have very high brilliance, comparable in fact to that of search lights. Displays made here accordingly can be perceived in fine detail at long distance and attract attention even in the presence of brilliant general illumination.

Additional objects of the invention will be apparent from the following specification.

The invention is shown in certain preferred embodiments in the accompanying drawings which in a broad way illustrate the general principles involved and the important optical factors of practical construction. It is to be understood that the invention may be variously embodied within the purview of the claims in devices making use of different mechanical arrangements of refractors, illuminants, lenticulations on the refractors, and conformations of the lenses, and is not limited to the constructions shown. The same numeral indicates the same part throughout.

Figure 1 is a front elevation of one side of a double faced display on which the effect of a fountain is produced on an illuminated background, making use of a grid of luminous tubing for the light sources. This view illustrates the production of motion effect at different speeds and in different directions from place to place over the display surface, and at varying speed along a given course. It also illustrates the illumination of a non-animated surface through the same refractor which produces the images used by the lenticulations of the front refractor to produce the animation effect.

Figure 2 is a cross section of the same taken as indicated by the section line 2—2 in Figure 1 and illustrates the production of the same effect on both sides of a sign of this type by a refractor belt which moves upward on one side and downward on the other.

Figure 3 is a sectional view of the same taken as indicated by the section line 3—3 in Figure 2 showing the mechanism, the refractor belt and the light source.

Figure 4 is a cross section of a modification of the device of the preceding views illustrating the use of a concentrated light source such as an incandescent lamp. The mechanical details of motor and bearings not shown in this view are the same as those of Figure 3.

Figure 5 is a diagrammatic illustration of the elemental optical system formed by one lens of each refractor in optical alignment with each other and the center of the light source. The collected and the projected beams are shown by their chief rays and the ray bundles described below are defined by their boundary rays. It is to be understood that in practice this condition is deviated from to the extent due to the finite width of the source, the aberrations of the lenses and the mechanical inaccuracies of the device.

Figure 6 is an illustration of the same combination after the lenses have been displaced from each other by the movement of one of the refractors and shows the manner in which the elemental beams are swept over the field of view.

Figure 7:
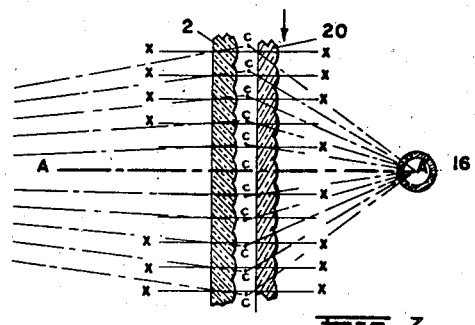

Figure 7 is a diagrammatic illustration of a section of each of the two refractors together with one branch of the tube grid which illuminates them. The chief rays of the beams collected by the lenses of the rear refractor from the center of the source are shown up to the center of the images between the refractors. For a given conformation of the lenses, the chief rays of the beams projected by the lenses of the front refractor are traced from the centers of the images to show the development of a convergent compounded beam which forms a compounded image in front of the device beyond the diagram. This diagram has been simplified in technical details as described below.

Figure 8:
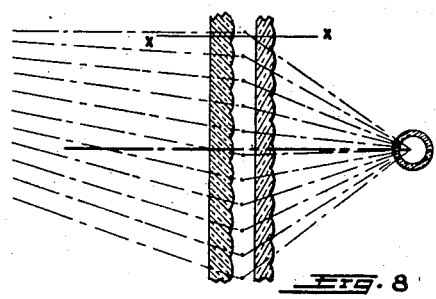
Figure 12:
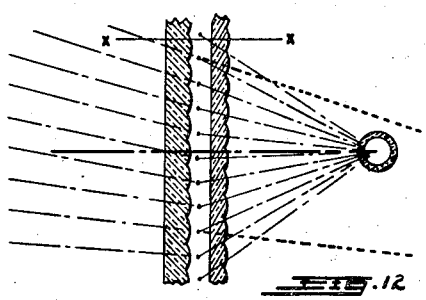
Figure 9:
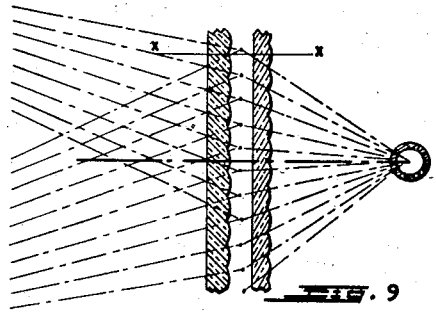
Figure 13:
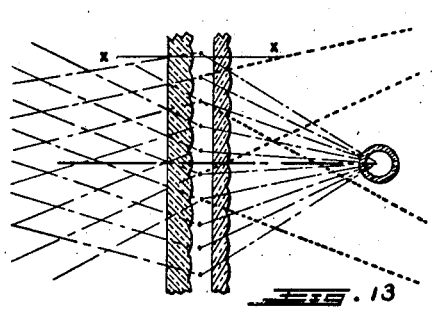
Figure 10:
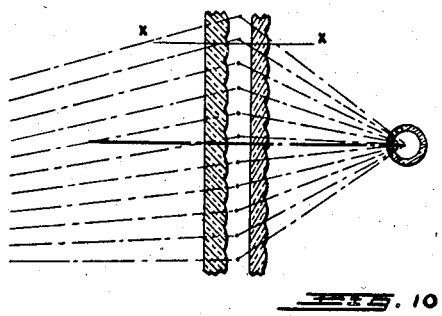
Figure 14:
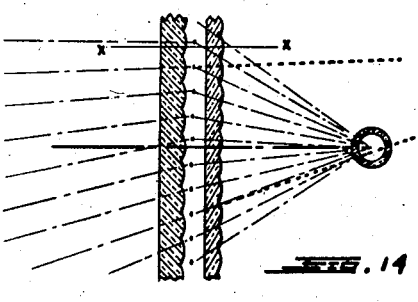

Figures 8 to 10 show successive stages of the cycle of changes in the projected beams as the rear refractor is moved one lens distance downward, with Figure 7 representing the next stage from Figure 10, in the continual movement of the refractor belt. The development of a new beam is shown as the beam of Figure 7 disappears upward with the consequent procession of a series of compounded real images of the source to the view in the opposite direction to that of the moving refractor.

Figures 11 to 14 are a similar series of diagrams for a different conformation of lenses chosen to project divergent compound beams which produce in effect a series of compounded virtual images behind the refractors moving in the same direction to view as the moving refractor. The images are beyond the diagrams and certain of the rays are traced backward with dotted lines to show their positions.

Figure 15 is a diagram of a modification of the arrangement of Figure 7 in which the real images have been brought closer to the refractors, closer to each other and caused to move at slower speed. The images are represented in this view by the points of convergence of the elemental beams.

Figure 11:
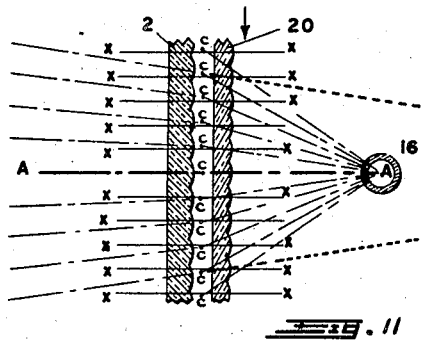

Figure 16 is a diagram of a modification of the arrangement of Figure 11 with lenses so constructed that the virtual images are closer to the refractors, closer together and within the scope of the view. The speed is likewise reduced.

Figure 17 is a diagram illustrating a certain technical correction in the optics of the combination.

Figures 18 and 19 are illustrations of the construction which produces movement transverse of that illustrated by the above described diagrams.

Figure 20 is a cross section of the forward one of the two refractors taken at the section line 20—20 in Figure 1 and illustrates the lighting of the background proper without animation from the same source and through the same moving refractor which produces the animation.

In all of the diagrams above I have shown a luminous tube as the light source. It is to be understood that these diagrams apply as well if a concentrated light source, such as that shown in Figure 4 is used, as the rearward refractor will project an elongated image in both cases with proper consideration for the focal spacing of the light.

In the device of Figures 1 to 3, a frame structure, indicated by numeral 1, supports two display plates, 2 and 3, one on each side of the device, and the lights, belt and mechanism. This structure includes the channel member 4 and the mitered edge members 5, 6, 7 and 8 which form an ornamental frame and retain the display plates. Spanning the frame internally from the member 4 are the cross bars 9 and 10 which carry the bearings 11, 12, 13 and 14 and the motor 15.

Also supported from the member 4 is the grid of gaseous conduction lighting tubes, indicated by 16. The terminals of this grid are connected to the transformer 17 also supported from the member 4. The drum 18, directly connected to the motor, is carried by the bearings of the upper bar. A free turning drum 19, similarly carried by the bearings of the lower cross bar, cooperates with the upper drum to carry the belt 20.

One surface of each display plate is formed with a series of lenticulations extending generally crosswise. These lenticulations vary in pitch and slant from place to place over the surface in accordance with the effect desired.

One surface of the refractor belt is also formed with lenticulations extending crosswise. Preferably these lenticulations are all parallel with each other and of uniform pitch. As a matter of convenience in manufacture I have selected the particular type of lenticulation. It is to be understood however that the lenticulations may involve curvature of both sides of the belt or such other cross section as may be desired within the purview of the invention. Likewise, similar modification of the cross section of the display plates are embraced by the invention.

While I prefer the use of elongated light sources as shown in Figures 1 to 3, the invention is not limited to the use of such illuminants but may be used also with concentrated light sources such as incandescent lamps. In Figure 4 is shown a typical adaptation of the invention to the use of such a source. This view is a vertical cross section through a device having a single lamp illuminating a single faced display and taken along a plane perpendicular to the display surface and passing through the center of the lamp. Another plane perpendicular to the figure and passing through the lamp will therefore also show divergent radiation from a concentrated source.

In both devices the lenses of the rearward refractor produce a series of elongated images of the light source which images constitute peculiarly arranged sources of radiation for the lenses of the forward refractor. The effects of animation are produced by the collection of this light according to certain orders described below and the projection of the resulting beams to the field of view.

The belt type inner or rear refractor is shown by way of one suitable embodiment. It is to be understood that any desired suitable type of refractor or mechanical drive for the same may be used within the purview of the claims.

In Figure 4 the box 25 carries the mechanical supports and drive for the belt 34 which is traversed across the opening in which is mounted the stationary refractor 24. This refractor is held in position against the inturned edge of the box, indicated by 26, by the frame 27. Spanning opposite sides of the box in the manner shown in Figures 2 and 3 are three bars 31, 32 and 33 which carry the bearings for the rollers 28, 29 and 30 and a suitable driving motor. The lamp 35 is mounted on the cross bar 32. To eliminate undesired reflections the inside surfaces of the box should be finished dark and non-reflective and additionally, to prevent reflections from the refractor near the lamp, I prefer to use the baffles 37 and 38 similarly finished and located as shown spanning the box.

The stationary refractor may be made of glass or any suitable transparent resin. The movable refractor may be made of any suitable plasticized transparent resin or fabricated from lenses of rigid material on a belt unit. The description of the optical principles involved which follows applies to devices having elongated illuminants and to devices having concentrated light sources, and in general applies to devices having any other suitable arrangement of refractors or types of mechanical drives.

In the diagrams the proportions of the elements have been departed from where deemed necessary to clarify the illustration and various aberrations of the lenses which are of minor import have been eliminated from the treatment. These diagrams are therefore to be construed as idealized descriptive illustrations setting forth the broad principles involved and not as involving any limitation on the claims.

In Figure 5 I show a section of the movable refractor and the corresponding lenses of the stationary refractor. To one of the lenses of the movable refractor I have drawn in a dashed line the chief ray of the bundle of rays which this lens will intercept from the center of the source. This line from A is drawn toward the center of curvature of the lens as far as the front surface of the lens where at B it is refracted toward the focus at C. The bundle of rays $a$ from the center of the source, shown in solid lines, will converge toward the point C, allowing of course for aberrations and dispersions which will introduce some conditioning in this analysis. In like manner rays from other points of the source will arrive at the region indicated as the "focal region" and build up an image of the source.

This image is highly distorted by the aberrations as well as by the elongation perpendicular to the figure. What we are concerned with, however, is not the fidelity of the image to the form of the source, but the manner in which the rays pass through the focal region to be gathered by the lenses of the front refractor and directed to the field of view. The term "image" is thus used in the claims in the sense of embracing the luminous region where a true image would exist but for the various aberrations of the device.

Considering now the rays emerging from this focal region: The bundle indicated by $c$ will be considered as representative of the rays emergent from the image as a whole. One lens of the front refractor is shown with its center of curvature directly in front of the point C. It will therefore collect that portion of the emergent rays which it intercepts, that is, the bundle indicated by $e$. These rays will be projected as a beam, and since in this device this beam is preferably of minimum divergence in the plane of the figure, the lens of the front refractor should be at focal spacing from the image. There will be an unavoidable divergence introduced by the finite size of the source and the distortions of the image, and of course, by the inaccuracies of the mechanism.

The portion of the bundle $c$ which is not collected by the lens under consideration is used by the adjacent lens in the manner which will be explained in connection with Figures 7 to 16.

In Figure 6 the lens of the front refractor has been shown in a new position as the refractors have been moved relative to each other. The portion of the bundle $c$ which is now collected by this particular lens is indicated by bundle $f$. It is seen that the resultant beam is taking a new direction as we draw a chief ray from the point C through this lens.

In Figures 7 to 10 is shown the manner in which convergent compounded beams are formed by the elemental beams so projected by a pair of refractors having lenses of the same frequency along the section considered.

In Figure 7 a series of parallel lines $x$—$x$ through the centers of curvature of the lenses of the rearward refractor is shown. The focal length of the lenses in this case is assumed to be greater than the distance from the curved surfaces to the centers of curvature with the consequence that the images will spread upward and downward away from the axis A—A through the center of the source perpendicular to the refractors. The lenses of the two refractors are in alignment in this figure and hence we find that the elemental beams converge toward a point in front of the device.

As the rearward refractor is moved downward with respect to the source and the other refractor the images are moved downward by new selections of rays from the source. The front refractor similarly makes new selections of rays from the images and projects a compounded beam convergent to a compounded image point which moves upward. As the alignment of the lenses changes portions of the bundles of rays from the elemental images are collected by the next lower lens for each position resulting in a new compound beam which moves upward as seen in Figures 9 and 10 to take the place of the beam shown in Figure 7 which finally disappears.

A procession of brilliant areas is thus seen by an observer to move upward over the region of the display for some distance each side of the light source. These areas are the regions of convergence of the elemental beams in front of the display, or in effect, compounded images of the source. Although these images are produced in space, they will always appear to be on the display surface where the effect of motion is to be produced because the observer perceives them only by virtue of the elemental beams of which they are composed and which are emitted from the display surface as these elemental beams come into alignment with his eye.

The speed of the effect will depend on the relative frequency, along the line of displacement, of the images produced by the rear refractor and the lenses of the front refractor. By increasing the relative frequency if the lenses of the front refractor as shown in Figure 15, the convergence of the compounded beams is increased, the compounded images are moved closer together and closer to the display surface and speed of the effect is reduced. In this figure the compounded images are developed around the points of convergence of the elemental beams indicated by R.

While I use the term "image" in this connection also, it is to be understood that this term is used in a broad sense of describing the luminous regions through which pass the rays which would produce a true image if all the technical corrections for aberration and inaccuracies of the device were made. Actually, these images are highly distorted so far as representing the shape of the source is concerned although they are entirely adequate for the purposes hereof.

In order to produce the effect of motion in the opposite direction, I reduce the frequency of the lenses of the front refractor compared to the images produced by the lenses of the rear refractor as shown in Figures 11 to 14. The projected elemental beams are now divergent from points behind the refractors, which are the central points of compounded virtual images. However, since these virtual images are only perceived by the projection of elemental beams to the eye from the surface over which the action is to be represented, they will appear to be on the display surface of the device.

As in the case of the real compounded images the virtual images are moved closer together, closer to the refractors and slowed in speed by increasing the relative frequency of the lenses of the rear refractor as shown in Figure 16 in which they are identified in position and indicated by S.

By making the frequency of the lenses of the front refractor the same as that of the images, the projected beam is composed of elemental beams which are all substantially parallel and therefore the observer will see intermittent flashes of light on the display surface, in effect, speed at infinity in either direction. In practice, however, due to the finite size of the source and the inaccuracies unavoidable in construction, the compounded beam will have a certain divergence so that this effect is only approximated. The size of the area over which this flash appears will depend on the divergence of this beam and for various purposes is subject to a certain amount of control in developing the final effect.

In order to produce varying speed along a given course, the device should preferably be constructed with the lenses of the moving refractor uniformly spaced and the lenses of the front refractor spaced at varying frequency according to the different speeds to be represented from place to place over the display surface.

In diagrams of Figures 7 to 16 I have shown the source as a gaseous conduction tube light positioned fairly close to the refractors. The images developed by the moving refractor are indicated as being nearly evenly spaced between the refractors. In practice there will be some variation of this spacing with consequent departure from the idealized conditions shown. If the device is constructed as shown in Figure 4 with the light well backward of the refractors the ideal conditions are fairly closely approximated.

If the device is constructed as shown in Figures 1 to 3 this variation of image spacing from the refractors must be taken into consideration in determining the frequency of the luminous tubes. For the purpose of clarity in the illustrations of the Figures 7 to 16 I have ignored the refraction at the front surfaces of the refractors which can be seen in Figures 5 and 6. This enters as an additional factor in determining the frequency of the tubes.

The distance each side of the source over which the effect will spread depends on several factors. The width of the source, the distance of the source from the refractors, the index of refraction of the lenses, the technical accuracy of the lenses and the accuracy of the spacing of the refractors entering as the major factors. In general there will be sufficient spread that a bank of luminous tubes such as shown in Figures 2 and 3 will effectively and efficiently illuminate a device such as that shown with such close spacing as to permit of very compact construction and without requiring highly perfected optical parts.

In the diagrams I have shown only the main beams which are developed to the field of view. Actually the beams shown are projected from even wider surfaces than shown and additional beams, but of decreasing intensity, are developed from the radiation passing through the images at sharper angles.

It is to be noted also that in the horizontal direction, which is perpendicular to the plane of the figures for a belt moving vertically, the beams spread to a very wide angle. The ordinary field of view is usually wide and shallow, and hence by this scheme we are most effectively directing the beams to those positions from which displays are ordinarily observed. The effect will be substantially the same over a very wide range of positions due to the fact that the bright regions will always seem to be on the portion of the display surface through which the beams pass to view regardless of the angle from which they are viewed. The term "field of view" is used in the claims to designate that area over which the display is ordinarily expected to be clearly distinguished.

In the diagrams the chief ray is found in some instance to cut the lens of the inner refractor adjacent the lens to which it refers. In such cases it is drawn for reference purposes and indicates the chief ray which would exist if the curved surface of the lens to which it refers were extended to cut it. Actually, of course, the ray along this path is collected as part of the bundle of the lens which it does intersect.

The conformation and spacing of the lenses may be variously modified within the purview of the claims, not being confined to the construction shown. The refractors may furthermore be constructed according to the requirement of the various applications of the invention in any suitable manner. The term "lens" is therefore to be broadly construed as embracing any type of refracting structure performing essentially as shown and described.

Due to the fact that there is a limit to the width of the surface over which the effect will spread each side of the light, it is ordinarily not necessary to use baffles between the tubes. However, in Figure 2 I have shown the baffles 43 positioned to prevent cross illumination between the sections of the refractors served by the various tubes. If such baffles are used, they should be finished dark and non-reflective. Their use is optional.

With a device made according to Figure 4 with the light source positioned well backward of the refractors, the movement of dark and light spots will be fairly close to the idealized conditions described. In Figure 2 however we can see that the conditions will change as we move from bottom to top of the display. Directly in front of the tubes the technical conditions described will exist for even rough construction. Between the tubes, where the rays strike the refractors at wide angles, the various inaccuracies enter to render the movement of the bright areas irregular. For many types of action, such as exemplified by the fountain effect shown, this is an advantage rather than a draw back, as a flowing water effect is not naturally represented by accurately spaced and regularly progressing bright areas. The same applies to numerous other effects, such as waving flags, flames, etc.

I take advantage of this circumstance to simplify the device to make it commercially useful with low cost construction. The proportionate spacing of Figure 2 is approximately correct for commercial street signs. The use of the single bank of tubes to illuminate both sides further provides for highly efficient lighting. It is to be noted that the same effect will be produced on both sides of the sign by varying the spacing of the lenses of the refractors on each side according to the principles set forth above. This applies as well to movements transverse of those illustrated in the diagrams as will be apparent in the description of horizontal components in the effect below.

One of the technical inaccuracies of the device consists of the variation of spacing of the images between the refractors. While in the practical cases this is not serious, it may be compensated for by varying the focal length of the lenses of the front refractor as shown in Figure 17. Here a section of the front refractor is shown to have lenses which increase in focal length away from the axis A—A so as to focus closely on the images. The bundles of rays collected from the image central points C are shown in solid lines.

In order to produce motion crosswise of the direction of relative displacement of the refractors, I slant the lenses of one refractor relative to those of the other. That is, since it is preferable to have the lenses of the moving refractor parallel and uniform in pitch, the lenses of the front refractor will vary in pitch and slant from place to place according to the desired effect. Thus, if the refractor belt moves downward on the side shown in Figure 1 the lenses of the front refractor at the region indicated by G will be spaced at a lesser frequency along the line of travel of the belt than the images produced by the corresponding lenses of the belt and additionally will slant downward to the right as shown in Figure 18. In this view the lenses of the front refractor are shown by dotted lines. On the opposite side of the sign the reverse relationship of lens and image frequency and lens slant will be observed for this part of the design.

In Figure 19 is shown the relative slant and frequency of the lenses of the two refractors for the region indicated by H, in Figure 1, where movement downward and to the left is to be represented.

Over the background of the design where no motion is to be shown, such as the region indicated generally by J a steady illumination is had by eliminating the lenticulations of the front refractor. The bundles of rays from the image thus are permitted to spread and cover the surface with fairly uniform illumination. Preferably one surface of the front refractor should be rendered light diffusive by etching, by the use of translucent coating of paint, or by random figuring.

In Figure 20 I show a section of the front refractor taken along the section line 20—20 in Figure 1 cutting one of the streams of the fountain. In this construction I have shown the lenticulations at the region G and smooth surfaces on the rear of the plate at the regions J. On the front of the plate a scene has been painted, the layer of paint being indicated by 45. This paint is light diffusive and serves to diffuse the light which reaches it through the rear refractor and thereby produce a general illumination.

I prefer to leave the front surface of the plate clear where the action is seen in order that the effect will be sharp. Referring now to the compounded images as shown in Figures 15 and 16, it is seen that these images are represented to the eye at each instant by the particular elemental beams which leave the display surface in the direction of the eye. The real images of Figure 15 are thus those regions through which pass the procession of elemental beams in the direction of the observer. Since the light areas thus developed are to appear to be on specific positions on the display surface, it is seen that a diffusion of the beams at the display surface would mask the desired effect.

The same is to be said about the virtual images of Figure 16. These images are indicated by a continuation backward of the chief rays of the projected elemental beams in dotted lines. Although they are positioned behind the refractors they appear on the display surface and would suffer from diffusion of the beams which give rise to the traveling effect.

Therefore it is desirable not to have any frosting, painting or other diffusing condition on the portions of the display surface through which the motion effect passes. However, there is no hard and fast principle involved on this point. The entire display surface may if desired be finished as a translucent sign and a condition of light permeability and diffusion selected over the animated portions which would soften the action effect without destroying it, while still having sufficient "body" to the display to present to view an apparently continuous picture.

In the preferred construction as shown in Figure 1, the general background J is finished by painting with translucent colors on the front smooth surface of the front refractor with whatever pictorial details desired, such as the fountain base K worked into the painting. The areas over which the water streams are represented are left clear so that the water effect is dependent wholly on the moving compounded images.

In the practice of the invention any equivalent combination of elements may be used within the purview of the claims to effect the optical traversing of one refractor across the other with respect to the light rays reaching the combination, the invention not being limited to the particular mechanical schemes described.

In the claims the following significance shall apply to the terms thereof:

The terms "light source" and "illuminant" embrace any object or surface rendered luminous and functioning as the sources of the specification.

The term "design" embraces any ornamental outline, inscription, symbol, or character.

The term "light region" embraces any region distinct in spectral component from adjacent regions.

The terms of the claims shall be broadly construed to embrace all substantial equivalents thereof.

Having thus described my invention, what I claim is:

1. A device for simulating motion in a design by the various movements of light areas thereover, comprising in combination: a plurality of elongated illuminants in bank formation extending over the display area over which the motion effect is to appear, a refractor movable in front of the same at substantially constant spacing therefrom having a plurality of elongated lenses in bank formation extending generally in the direction of said illuminants and evenly spaced in the transverse direction thereof, said refractor being projective of a bank of elongated images of said illuminants, a stationary refractor positioned in front of said movable refractor having a series of elongated lenses in bank formation extending generally in the direction of said illuminants and spaced in an orderly fashion crosswise thereof, the lenses of the last said refractor being conformed and spaced to focus on said images and project therefrom to the field of view elemental beams of light which are of narrow divergence in the dimension thereof transverse of said illuminants, the lenses of the last said refractor being variously slanted to the lenses of the first said refractor from region to region over the display area thereof in accordance with the desired movements of light areas over said design, and means to transverse said movable refractor to move the lenses thereof across the lenses of the stationary refractor while maintaining the optical spacing between the refractors above specified.

2. A device for simulating motion in designs on both sides of a double faced display by the various movements of light areas thereover, comprising in combination: a plurality of elongated illuminants extending in substantially parallel bank formation along a plane, a refractor on each side of said bank of illuminants movable in front thereof at substantially constant spacing therefrom and having each a plurality of elongated lenses in bank formation extending generally in the direction of said illuminants and evenly spaced in the transverse direction thereof, said refractors being projective each of a bank of elongated images of said illuminants, a stationary refractor in front of each of said movable refractors having each a series of elongated lenses in bank formation extending generally in the direction of said illuminants and spaced in an orderly fashion crosswise thereof, the lenses of the last said refractor being conformed and spaced to focus on said images and project therefrom to the field of view elemental beams of light which are of narrow divergence in that dimension thereof transverse of said illuminants, the lenses of the last said refractors being variously slanted to the lenses of the first said refractors from region to region over the display areas thus presented in accordance with the desired motion effects to be produced, and means to traverse said movable refractors to move the lenses thereof across the lenses of the stationary refractors while maintaining the optical spacing between said refractors above specified.

3. A device for simulating motion in a design by the various movements of light areas thereover, comprising in combination: a light source and a pair of refractors positioned one in front of the other in front of said source together with means to traverse, in optical effect, one of said refractors across the other along a given direction line while maintaining the optical spacing between the same below specified; each of said refractors having a series of elongated lenses extending in bank formation crosswise of said direction line and spaced in an orderly fashion therealong, the lenses of the rearward one of said refractors being conformed to project a series of elongated images of said source, the lenses of the forward one of said refractors being so conformed and so spaced as to focus on said images and project therefrom to the field of view elemental beams of light which are of narrow divergence in that dimension of their cross section paralleling said direction line, the lenses of one of said refractors being slanted relative to the corresponding lenses of the other refractor to different degrees from region to region over the display surface thus presented in accordance with the desired component of the motion effect to be produced transverse of said direction line, the frequency of the lenses of the forward one of said refractors being varied as compared to the frequency of the images produced by the corresponding lenses of the other refractor from region to region over the display surface in accordance with the desired component of the motion effect to be produced lengthwise with said direction line, whereby the elemental beams thus projected converge to real compounded images of said source or diverge from virtual compounded images of said source, said compounded images moving in representation of the desired motion effect at different rates from place to place over the display surface, both of said variations occurring at least in some of the same regions.

4. A device for simulating motion in a design by the various movements of light areas thereover, comprising in combination: a plurality of elongated illuminants extending generally in the same direction and spaced from each other in a bank formation extending along a plane, a pair of refractors positioned one in front of the other in front of said bank of illuminants, and means to traverse, in optical effect, one of said refractors across the other along a given direction line while maintaining the optical spacing between the same below specified; each of said refractors having a series of elongated lenses extending in bank formation in the same general direction as said illuminants and spaced evenly in the direction of said direction line, the lenses of the rearward one of said refractors being conformed to project a series of elongated images of said illuminants, the lenses of the forward one of said refractors being so conformed and so spaced as to focus on said images and project therefrom to the field of view elemental beams of light which are of narrow divergence in that cross sectional dimension thereof which parallels said direction line, the lenses of one of said refractors being slanted relative to the corresponding lenses of the other refractor to different degrees from region to region over the display surface thus presented in accordance with the desired component of the motion effect to be produced transverse of said direction line, the frequency along said direction line of the lenses of the forward one of said refractors being varied as compared to the frequency of the images produced by the corresponding lenses of the other refractor from region to region over the display surface in accordance with the desired component of the motion effect to be produced lengthwise with said direction line, whereby the elemental beams thus projected converge to real compounded images of said source or diverge from virtual compounded images of said source, said compounded images moving in representation of the desired motion effect at different rates from place to place over the display surface, both of said variations occurring at least in some of the same regions.

5. A device for simulating motion in a design over selected areas thereof by transilluminating with an animation effect; and transilluminating without animation other areas thereof, comprising in combination: a light source and a pair of refractors positioned one in front of the other in front of said source together with means to traverse, in optical effect, one of said refractors across the other along a given direction line while maintaining the optical spacing between the same below specified; each of said refractors having a series of elongated lenses extending in bank formation crosswise of said direction line and spaced in an orderly fashion therealong, the lenses of the rearward one of said refractors being conformed to project a series of elongated images of said source, the lenses of the forward one of said refractors being so conformed and so spaced as to focus on said images and project therefrom to the field of view elemental beams of light which are of narrow divergence in that cross sectional dimension thereof parallelling said direction line, the lenses of one of said refractors being slanted relative to the corresponding lenses of the other refractor to varying degrees from region to region of the animated portion of the display surface thus presented in accordance with the desired component of the motion effect to be produced transverse of said direction line, the lenses of the forward one of said refractors being varied in frequency along said direction line as compared to the images produced by the corresponding lenses of the other refractor from region to region of the animated portion of the display surface in accordance with the desired component of the motion effect to be produced along said direction line, whereby the elemental beams thus projected converge to real compounded images of said source or diverge from virtual compounded images of said source, said compounded images moving in representation of the desired motion effect at different rates from place to place over the display surface, both of said types of variation occurring at least in some of said regions, the forward one of said refractors being diffusive to light to a degree sufficient to mask all motion effect over those portions of the display surface which are to be transilluminated without animation.

6. A device for simulating motion in a design by the various movements of light areas thereover, comprising in combination: a light source and a pair of refractors positioned one in front of the other in front of said source together with means to traverse, in optical effect, one of said refractors across the other along a given direction line while maintaining the optical spacing between the same below specified; each of said refractors having a series of elongated lenses extending in bank formation crosswise of said direction line and spaced in an orderly fashion therealong, the lenses of the rearward one of said refractors being conformed to project a series of elongated images of said source, the lenses of the forward one of said refractors being so conformed and so spaced as to focus on said images and project therefrom to the field of view elemental beams of light which are of narrow divergence in that dimension of their cross section paralleling said direction line, whereby the elemental beams thus projected converge to real compounded images of said source or diverge from virtual compounded images of said source, said compounded images moving in representation of the desired motion effect at different rates from place to place over the display surface.

7. A device for simulating motion in a design by the various movements of light areas thereover, comprising in combination: a light source and a pair of refractors positioned one in front of the other in front of said source together with means to traverse, in optical effect, one of said refractors across the other along a given direction line while maintaining the optical spacing between the same below specified: each of said refractors having a series of elongated lenses extending in bank formation crosswise of said direction line and spaced in an orderly fashion therealong, the lenses of the rearward one of said refractors being conformed to project a series of elongated images of said source, the lenses of the forward one of said refractors being so conformed and so spaced as to focus on said images and project therefrom to the field of view elemental beams of light which are of narrow divergence in that dimension of their cross section paralleling said direction line, the frequency of the lenses of the forward one of said refractors being varied as compared to the frequency of the images produced by the corresponding lenses of the other refractor from region to region over the display surface in accordance with the desired component of the motion effect to be produced lengthwise with said direction line, whereby the elemental beams thus projected converge to real compounded images of said source or diverge from virtual compounded images of said source, said compounded images moving in representation of the desired motion effect at different rates from place to place over the display surface.

8. A device for simulating motion in a design by the various movements of light areas thereover, comprising in combination: a light source and a pair of refractors positioned one in front of the other in front of said source together with means to traverse, in optical effect, one of said refractors across the other along a given direction line while maintaining the optical spacing between the same below specified; each of said refractors having a series of elongated lenses extending in bank formation crosswise of said direction line and spaced in an orderly fashion therealong, the lenses of the rearward one of said refractors being conformed to project a series of elongated images of said source, the lenses of the forward one of said refractors being so conformed and so spaced as to focus on said images and project therefrom to the field of view elemental beams of light which are of narrow divergence in that dimension of their cross section paralleling said direction line, the frequency of the lenses of the forward one of said refractors being greater along said direction line than the frequency of the images produced by the corresponding lenses of the other refractor at certain regions of the display surface, whereby the elemental beams thus projected converge to real compounded images of said source, and the frequency of the lenses of the forward one of said refractors being less along said direction line than the frequency of the images produced by the corresponding lenses of the other refractor at certain other regions of the display surface, whereby the elemental beams thus projected diverge from virtual compounded images of said source, said real images moving in one direction along said direction line and said virtual images moving in the opposite direction along said direction line in representation of the desired motion effect over the display surface.

9. A device for simulating motion in a design by the various movements of light areas thereover, comprising in combination: a light source and a pair of refractors positioned one in front of the other in front of said source together with means to traverse, in optical effect, one of said refractors across the other along a given direction line while maintaining the optical spacing between the same below specified; each of said refractors having a series of elongated lenses extending in bank formation crosswise of said direction line and spaced in an orderly fashion therealong, the lenses of the rearward one of said refractors being conformed to project a series of elongated images of said source, the lenses of the forward one of said refractors being so conformed and so spaced as to focus on said images and project therefrom to the field of view elemental beams of light which are of narrow divergence in that dimension of their cross section paralleling said direction line, the frequency of the lenses of the forward one of said refractors gradually changing with respect to the images produced by the corresponding lenses of the other refractor along said direction line in such order that the projected elemental beams converge to real compounded images of said source or diverge from virtual compounded images of said source to different degrees from point to point along said direction line, whereby the compounded images so produced move at gradually changing speed therealong in representation of the desired motion effect over the display surface.

10. A device for simulating motion in a design by the various movements of light areas thereover, comprising in combination: a light source and a pair of refractors positioned one in front of the other in front of said source together with means to traverse, in optical effect, one of said refractors across the other along a given direction line while maintaining the optical spacing between the same below specified; each of said refractors having a series of elongated lenses extending in bank formation crosswise of said direction line and spaced in an orderly fashion therealong, the lenses of the rearward one of said refractors being conformed to project a series of elongated images of said source, the lenses of the forward one of said refractors being so conformed and so spaced as to focus on said images and project therefrom to the field of view elemental beams of light which are of narrow divergence in that dimension of their cross section paralleling said direction line, whereby the elemental beams thus projected converge to real compounded images of said source or diverge from virtual compounded images of said source, the lenses of one of said refractors being slanted relative to the corresponding lenses of the other refractor in at least one region of the display surface in accordance with the desired component of the motion effect to be produced transverse of said direction line over the display surface at said region.

11. A device for simulating motion in a design by the various movements of light areas thereover, comprising in combination: a light source and a pair of refractors positioned one in front of the other in front of said source together with means to continuously traverse, in optical effect, one of said refractors across the other along a given direction line while maintaining the optical spacing between the same below specified; each of said refractors having a series of elongated lenses extending in bank formation crosswise of said direction line and spaced in an orderly fashion therealong, the lenses of the rearward one of said refractors being conformed to project a series of elongated images of said source, the lenses of the forward one of said refractors being so conformed and so spaced as to focus on said images and project therefrom to the field of view elemental beams of light which are of narrow divergence in that dimension of their cross section paralleling said direction line, whereby the elemental beams thus projected converge to real compounded images of said source or diverge from virtual compounded images of said source, the lenses of one of said refractors being slanted relative to the corresponding lenses of the other refractor to different degrees from region to region over the display surface thus presented in accordance with the desired component of the motion effect to be produced transverse of said direction line over the display surface.

FRED HOTCHNER.

REFERENCES CITED

The following references are of record in the file of this patent:

UNITED STATES PATENTS

| Number | Name | Date |
|---|---|---|
| 1,867,916 | Harase | July 19, 1932 |
| 1,869,276 | Precourt | July 26, 1932 |
| 2,216,261 | Bergman | Oct. 1, 1940 |
| 1,198,848 | Johanson | Sept. 19, 1916 |
| 1,451,520 | Wisniewski | Apr. 10, 1923 |
| 1,862,078 | Falge | June 7, 1932 |
| 1,827,963 | Wompey | Oct. 20, 1931 |

FOREIGN PATENTS

| Number | Country | Date |
|---|---|---|
| 417,428 | England | Oct. 4, 1934 |
| 606,316 | France | Mar. 8, 1926 |
| 786,107 | France | June 3, 1935 |